United States Patent [19]
Fallon et al.

[11] 4,449,412
[45] May 22, 1984

[54] SAFETY PRESSURE GAGE

[75] Inventors: Merton R. Fallon, Thousand Oaks, Calif.; Thomas W. Clements, Ambler, Pa.

[73] Assignee: Draft Systems, Inc., Northridge, Calif.

[21] Appl. No.: 425,670

[22] Filed: Sep. 28, 1982

[51] Int. Cl.³ .................... G01L 7/04; G01L 19/06
[52] U.S. Cl. ..................................... 73/738; 73/706; 73/756
[58] Field of Search ............... 73/738, 756, 706, 707

[56] References Cited
U.S. PATENT DOCUMENTS

| | | | |
|---|---|---|---|
| 1,148,361 | 7/1915 | Coxe | 73/707 |
| 2,522,007 | 9/1950 | Willach | 73/738 |
| 3,335,610 | 8/1967 | Nelson | 73/738 |

FOREIGN PATENT DOCUMENTS 4037 of 1890 United Kingdom ................. 73/706

Primary Examiner—Donald O. Woodiel
Attorney, Agent, or Firm—James E. Brunton

[57] ABSTRACT

A combined fluid pressure gage and safety pressure relief device for interconnection with systems wherein excess fluid pressure will cause explosions likely to result in injury to personnel and damage to surrounding equipment. The device accurately measures fluid pressure within the system to which it is connected so long as the system pressure remains within the working range of the pressure gage. However, should the system pressure exceed the normal full scale pressure reading on the gage, the device will instantly and automatically safely vent the system to atmosphere. Once the device is vented the pressure relief mechanism must be manually reset by skilled technicians using special tools before the apparatus can be reused.

12 Claims, 3 Drawing Figures

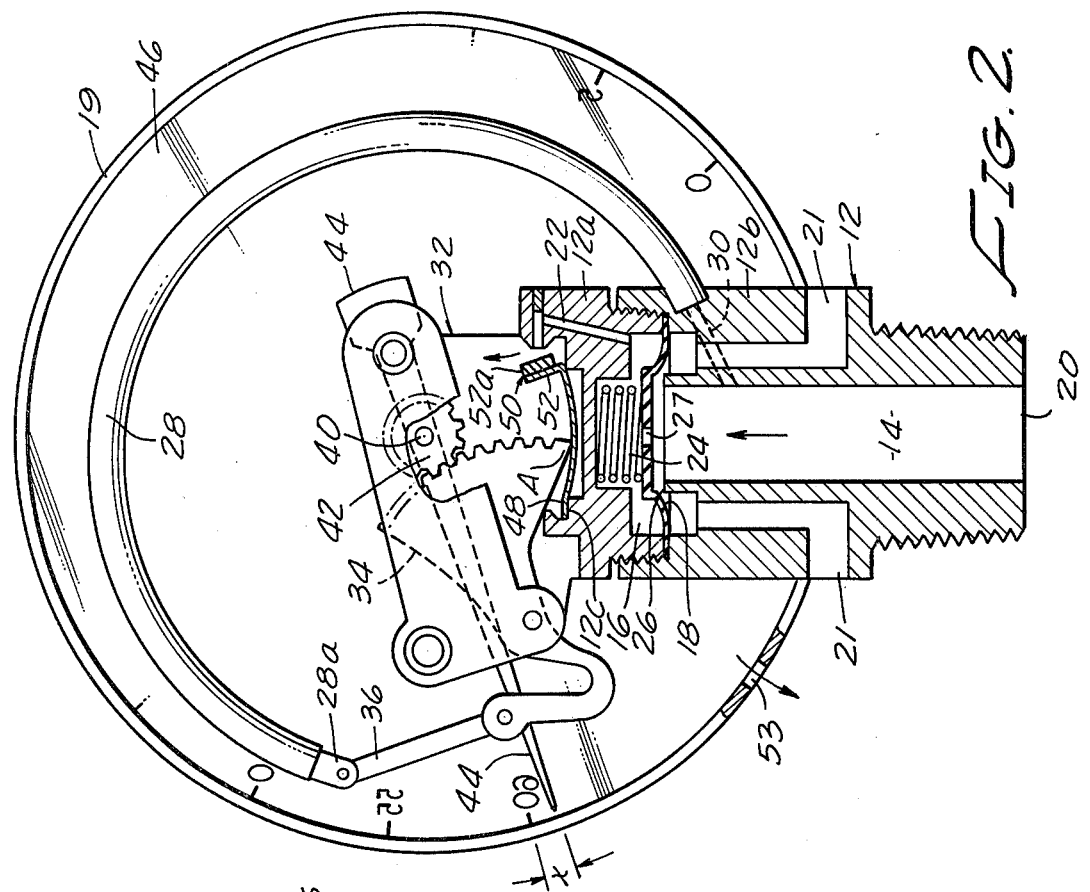
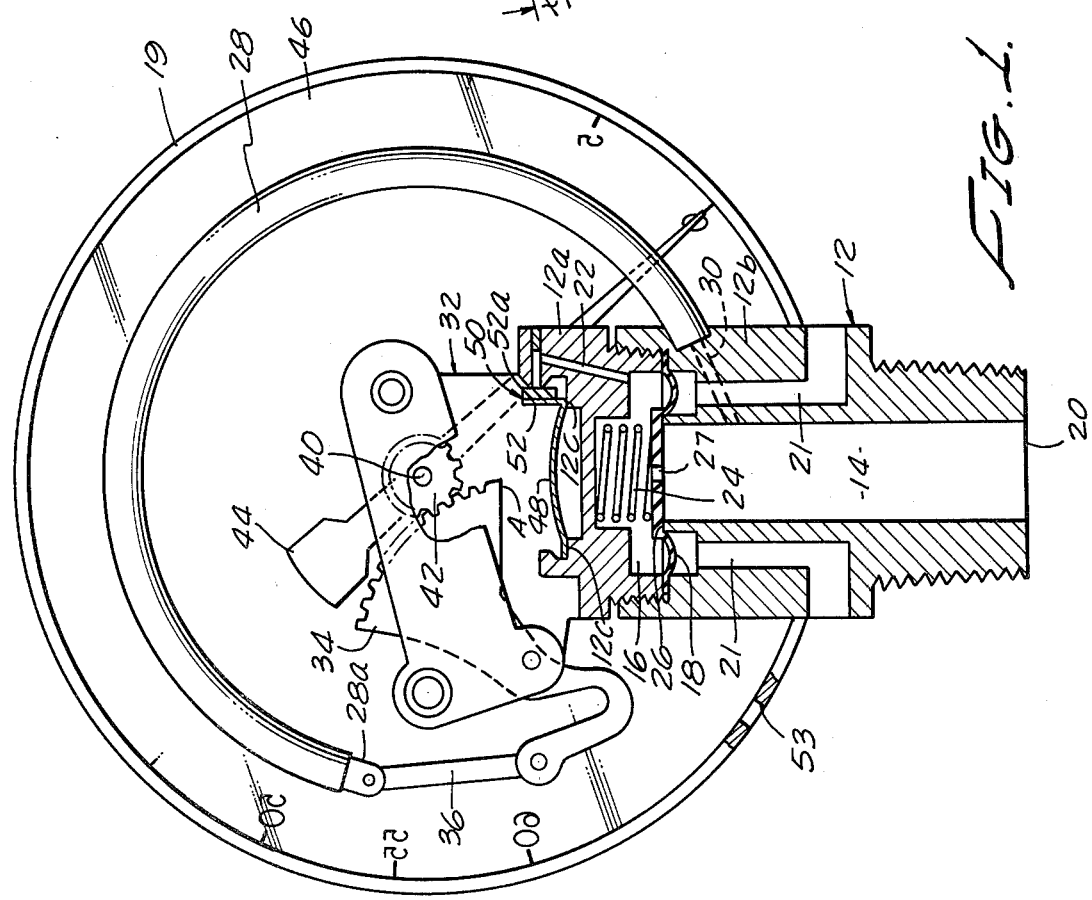

SAFETY PRESSURE GAGE

BACKGROUND OF THE INVENTION

1. Field of the Invention

The present invention relates generally to safety devices for use in connection with fluid pressure systems. More particularly the invention concerns a unique combination fluid pressure gage and safety pressure relief device for automatically venting the fluid pressure system to atmosphere in the event of over-pressurization.

2. Discussion of the Prior Art

Various types of pressure gages have been suggested for use in measuring fluid pressure within pressure systems. Such gages include Bourdon-Tube pressure gages, diaphragm pressure gages, capsule-type pressure gages and piston-type pressure gages. The designers of fluid pressure gages have typically been concerned with gage accuracy, reliability and cost and have left to others the development of hardware adapted to guard against system over-pressurization.

Those concerned with safety devices such as automatic pressure relief devices, on the other hand, have generally not involved themselves with pressure measuring mechanisms. Rather, they have concentrated on the design of various types of self contained mechanisms adapted to be installed as separate units within pressure systems to guard against inadvertant over-pressurization of the system. Typical of prior art pressure relief or safety devices are pop-off valves, burst discs, and various types of in line pressure regulating and pressure limiting devices.

Many prior art pressure relief and safety devices have proven unreliable in use. For example, relief valves of standard design frequently fail to open reliably at their intended pre-set pressure for a variety of reasons. Such devices may fail to open because of improper design, improper maintenance, or accidental or intentional damage to the device. Additionally, prior art devices of ordinary design may fail to open properly because contaminants in the system have succeeded in effectively glueing the relief valve seat to the land surrounding the relief valve bore. This glueing force adds to the force of the relief valve spring and frequently results in the relief valve failing to lift until the pressure within the system has reached a level which may be four or five times the intended pre-set venting pressure.

The apparatus of the present invention for the first time combines into a single, integral unit a highly accurate and reliable pressure gage and a fail safe pressure relief valve mechanism. Due to its unique design, the device of the invention overcomes the drawbacks of prior art devices as previously discussed and prevents the highly dangerous potential failure of the pressure gage itself in the event of system overpressurization.

As will be discussed in greater detail in the paragraphs which follow, the relief mechanism of the apparatus of the invention remains closed so long as the pressure to the gage is within the normal working range at the gage. When the pressure to the gage exceeds the normal full scale pressure, additional travel of the pressure sensing element and associated gage movement will cause venting of an interiorly disposed pilot nozzle, allowing the relief valve to go wide open, thereby venting to atmosphere the excess pressure in the system. Further, because of the unique tripping action design of the relief valve, it will remain wide open until reset by a skilled knowledgeable technician using a special tool. This will normally require that the original cause of system malfunction be corrected before the system can again be pressurized.

Another important aspect of the relief valve of the apparatus of the invention resides in the fact that it will automatically open at a point slightly beyond full scale gage pressure regardless of the nominal range of the gage.

SUMMARY OF THE INVENTION

It is an object of the present invention to provide a combination fluid pressure gage and pressure relief device for use in systems where excess fluid pressure in the system will cause explosions likely to result in injury to personnel and damage to associated equipment.

More particularly, it is an object of the invention to provide a device of the aforementioned character which accurately and reliably provides a reading of the fluid pressure within the system to which it is connected so long as the pressure remains within the working range of the pressure gage. However, should the pressure within the system exceed the normal full scale pressure reading on the gage, the device will instantly and automatically vent the system to atmosphere.

It is another object of the invention to provide a device as described in the preceeding paragraphs which cannot be used after venting to atmosphere due to excess pressure within the system until the device is disassembled by a skilled knowledgable technician using a special tool and the relief valve mechanism thereof manually reset.

It is another object of the invention to provide a device of the character described in which the relief valve mechanism of the device is interiorly located so as to prevent tampering, accidential damage to the mechanism and contamination of the mechanism tending to render the mechanism inoperable.

It is still another object of the invention to provide a device as heretofore described which, due to its unique design, will automatically vent to atmosphere when full scale gage pressure is exceeded without regard for the absolute value of the full scale pressure. Stated another way, whether the full scale gage pressure is 60 pounds, 160 pounds or 600 pounds, the device will safely, reliably and automatically vent to atmosphere when the particular full scale gage pressure shown on the gage is exceeded.

It is yet another object of the invention to provide a device as described in the previous paragraphs which is highly reliable in use, is easy to install on high pressure systems of standard design and one which can be inexpensively manufactured in large volume.

BRIEF DESCRIPTION OF THE DRAWINGS

FIG. 1 is a rear elevational view of one form of the Safety Pressure Gage of the invention shown partly in cross-section to illustrate internal construction.

FIG. 2 is a rear elevational view similar to FIG. 1, but showing the relative position of the component parts of the device when the pressure indicating mechanism has moved from a zero pressure reading to a pressure reading which exceeds the nominal maximum pressure range of the gage.

DESCRIPTION OF THE PREFERRED FORMS OF THE INVENTION

Figure 3:
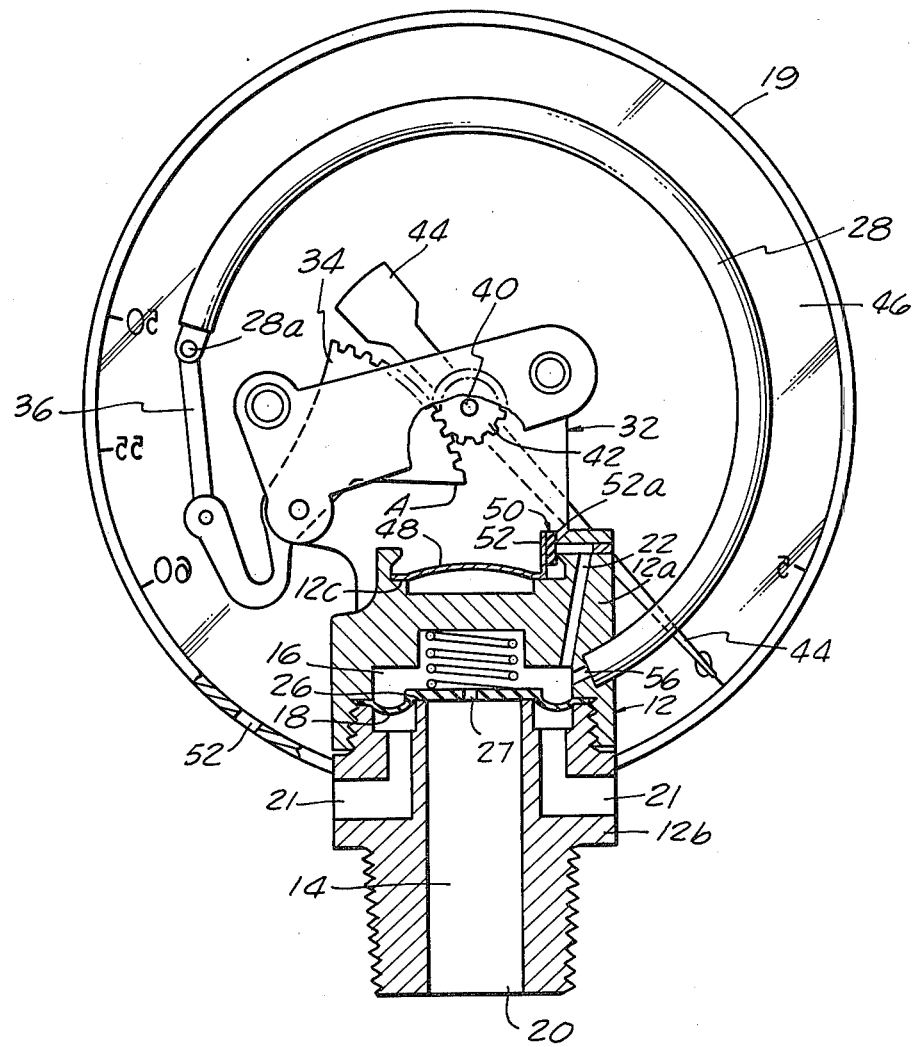
FIG. 3 is a rear elevational view partly in cross-section of another embodiment of the Safety Pressure Gage of the invention.

Referring to the drawings and particularly to FIGS. 1 and 2 there is shown a first form of the safety pressure gage of the invention comprising a housing 12 having first and second internal chambers 14 and 16 respectively and an elastomeric diaphragm 18 separating the first and second chambers. A fluid pressure measuring means which is disposed within a casing 19 carried by housing 12, is operably associated with chambers 14 and 16 and is adapted to measure pressure exerted by fluid flowing from a source of fluid under pressure into chambers 14 and 16 through a fluid inlet 20. Casing 19 is vented to atmosphere and second chamber 16 is provided with first and second passageways 21 and 22 respectively. During normal operation both passageways 21 and 22 are closed. However, in a manner presently to be described, if the device is overpressurized, these passageways will be automatically vented to atmosphere thereby instantly correcting the unsafe, overpressurized condition.

Housing 12 comprises threadably interconnected upper and lower portions 12a and 12b respectively. Lower portion 12b of housing 12 is externally threaded proximate its lower end for interconnection with an appropriate fitting provided on the source of fluid under pressure to which the device is to be connected. The peripheral portion of diaphragm 18 is clamped between threadably interconnected upper and lower body portions 12a and 12b of housing 12 and a biasing means, shown here in the form of a coil spring 24, acts against the central portion of diaphragm 18 to urge the diaphragm into a closed position against a relief valve seat or land 26 provided proximate the upper end of chamber 14. Coil spring 24 is of low magnitude and bears no relation to the pressure at which the relief valve will open.

Diaphragm 18 is provided with a small centrally disposed aperture, or fluid passageway 27 which interconnects first and second chambers 14 and 16. In a manner presently to be described, diaphragm 18 is movable from a first closed position, as shown in FIG. 1, to a second open position as shown in FIG. 2. As illustrated in FIG. 2, in the second, open position the diaphragm 18 has moved upwardly against the urging of coil spring 24 and is spaced apart from valve seat 26 thereby opening chamber 14 to atmosphere via passageways 21.

In the form of the invention shown in FIGS. 1 and 2, the previously mentioned fluid pressure measuring means comprises pressure sensing means for sensing the fluid pressure within fluid inlet 30 and within chambers 14 and 16. The measuring means also includes operating means associated with the pressure sensing means and indicating means coupled with the operating means for indicating pressure within chambers 14 and 16 between a range of zero pressure and the predetermined maximum pressure reading of the gage.

While the pressure sensing means may take various forms, it is here shown as comprising an elongated yieldably deformably hollow tube 28 affixed proximate one end to housing 12 and interconnected proximate its opposite end with the aforementioned operating means. Tube 28, which is commonly known as Bourdon tube, is interconnected with housing 12 so that the interior thereof is in communication with inlet 30 and first chamber 14 through a small fluid passageway 30.

In the preferred form of the invention the operating means comprises an operating means supporting structure 32 carried by housing 12 within casing 19 and a sector gear 34 pivotally carried by the supporting structure. Sector gear 34 is operably interconnected with the opposite, or free end 28a of the tube 28 by means of a connecting linkage 36. With this arrangement, sector gear 34 is pivotally movable in response to radially outward movement of the free end 28a of tube 28 as fluid pressure within the interior of the tube tends to straighten the tube.

The indicating means of the present form of the invention comprises a shaft 40 rotatably carried by supporting structure 32 and a pinion 42 which is mounted on the shaft 40 and is adapted to mateably engage and be driven by sector member 34. A pointer 44 is also connected with shaft 40 and is adapted to transverse an arc of approximately 250° upon pivotal movement of sector member 34 in response to the outward deflection of the Bourdon tube. Also forming a part of the indicating means of the invention is a calibrated gage face plate 46 which may be calibrated for various pressure readings between a zero pressure reading and a maximum pressure, of, for example, 60 pounds as shown on FIGS. 1 and 2. It is to be understood that the pressure readings of zero to 60 are merely exemplary and, depending upon the design and configuration of the Bourdon tube, the gage may be adapted to measure pressures from zero to several hundred pounds per square inch. As will become apparent from the discussion which follows, an important aspect of the device of the present invention resides in the fact that regardless of the nominal pressure range of the particular gage, the device will automatically be vented to atmosphere upon overpressurization of the device. In other words, when the pressure indicating means indicates a pressure in excess of the maximum nominal pressure reading of the particular gage whether it be 60 or 600 pounds per square inch (psi), the device will be instantly and automatically vented to atmosphere.

Another important feature of the device of the present invention resides in the novel design of the valve means carried by housing 12 for normally closing second passageway 22 leading to chamber 16. In the embodiment of the invention shown in the drawings, this unique valve means comprises a yieldably deformable body portion 48 adapted to be seated against a shoulder 12c formed in the upper body portion of body portion 12a and a closure means 50 connected to one side of body portion 48. Closure means 50 is movable with body portion 48 from a first position shown in FIG. 1 wherein the passageway 22 is closed into a second position shown in FIG. 2 wherein passageway 22 is opened to the interior of casing 19 and thusly to atmosphere through apertures in the casing such as aperture 53. While the valve means may be constructed in various configurations, in the preferred form of the invention, it is provided in the form of a toggle action type leaf spring constructed of a metal spring material. As best seen by referring to FIG. 1, the body portion 48 of the valve means is normally convex in shape with respect to shoulders 12c and is provided at its edge portions with engagement surfaces adapted to seat against the shoulders 12c. Closure means 50 includes an upwardly extending rigid tab member 52 which is integrally formed with body portion 48 and an elastometic valve seat 52a which is affixed to tab member 52 and is adapted to sealably engage the opening to passageway 22.

With the construction of the device shown in FIGS. 1 and 2, fluid under pressure flowing to the gage through inlet passageway 20 communicates with the Bourdon tube 28 through passageway 30 and with chamber 16 through aperture 27 provided in diaphragm 18. Thus, the Bourdon tube movement and the pressure indicating means associated therewith reacts to inlet pressure variations in the same manner as any pressure gage of standard design. The volume of fluid above the diaphragm within chamber 16 also communicates with the valve seat 52a through passageway 22. Preferably the cross-sectional area of passageway 22 is made approximately twice that of the cross-sectional area of the aperture 27 formed in diaphragm 18. As illustrated in FIG. 1, in conditions of normal operation, passageway 22 is closed by the toggle action of leaf spring 48 which positions the closure means 50 against the opening to passageway 22. Thus, under steady state conditions, the pressure in chamber 16 and the pressure in the interior of the Bourdon tube 28 is exactly equal to the fluid pressure within chamber 14 and inlet 20. With this arrangement it is apparent that the inlet pressure via aperture 27 acts downwardly on the entire upper surface of the diaphragm 18. Conversely, the inlet fluid pressure can act upwardly only on the area of the diaphragm defined by the diameter of the valve seat or land 26. Since the upper surface of the diaphragm 18 which is exposed to pressure within chamber 16 is typically three to four times that of the area of the diaphragm exposed to fluid pressure within chamber 14, a substantial downward force is continuously exerted on the upper surface of the diaphragm tending to firmly seat the central portion thereof against valve seat, or land 26. It follows that the higher the inlet fluid pressure the higher is the force tending to seat the diaphragm against the valve seat 26 thus eliminating any chance of extraneous seat leakage at higher pressures. This condition persists so long as passageway 22 remains closed by closure means 50.

Should the inlet fluid pressure rise beyond the normal full scale pressure of the device, continued pivotal movement of sector gear 34, as illustrated in FIG. 2, will cause the corner "A" thereof to move into contact with the center of body portion 48 of the valve means. Since the body portion 48 of the valve means is installed in a tensioned convex position, the elastomeric seat 52a will continue to bear against the opening to passageway 22 until the force exerted by the sector gear corner "A" is sufficient to yieldably deform the body portion to an "over center" condition causing the spring to snap into a concave configuration as shown in FIG. 2. As the body portion of the spring means moves from the upward convex to the downward concave position, valve seat 52a will move away from the opening of passageway 22 to the interior of the case and accordingly to atmosphere. Preferably, the cross-sectional area of passageway 22 is made substantially larger than that of aperture 27, so that upon the opening of passageway 22 the pressure within chamber 16 above diaphragm 18 will quickly drop to a pressure approaching atmospheric pressure. Under these conditions, the inlet fluid pressure will readily overcome the small bias force exerted by coil spring 27 permitting the diaphragm 18 to move upward to a second open position as shown in FIG. 2. In this configuration, the device is now completely vented and the fluid within chambers 14 and 16 will vent rapidly to atmosphere through the passageways 21 provided in the lower portion 12b of the body.

Because of the "over center" or toggle type behavior of the spring 48, the closure means 50 will remain in an open position and the device cannot automatically close to atmosphere as the sector 34 pivots to its starting position. Rather the spring 48 must be manually reset in order to once again close off passageway 22 and thereby obtain steady state operating conditions. In this connection, the device is specially designed so that the manual resetting of the leaf spring 48 can be accomplished only by trained personnel using the special tools necessary to enable the leaf spring to be manually reset to its normal convex configuration as shown in FIG. 1. With the leaf spring thus reset, closure means 50 will once again assume the position shown in FIG. 1 securely closing passageway 22 from atmosphere. Assuming the cause of the overpressurization has been determined and corrected, the device can then be reused in normal steady state conditions within the particular pressure range of the gage.

Turning to FIG. 3 there is shown a second form of the safety pressure gage of the invention. This second embodiment of the invention is quite similar in construction and operation to the first form of the invention already described. Accordingly, like numbers have been used in FIG. 3 to identify like components as shown in FIGS. 1 and 2.

The principal difference between the two forms of the invention resides in the location of attachment of the hollow tube 28 to the body portion 12. As seen in FIG. 3, in this second embodiment the tube 28 is connected to the upper body portion 12a, rather than to the lower portion 12b, and communicates not with lower chamber 14 but rather with upper chamber 16 via a passageway 56. With this construction, the inlet fluid pressure to the gage communicates with the Bourdon tube 28 through passageway 56 via openings 27 in diaphragm 18. Thus the Bourdon tube movement, through the pressure sensing and indicating means of the invention as previously described, reacts to inlet pressure through inlet 20 in the same manner as a gage of conventional construction.

The relocation of the connection point of the Bourdon tube as shown in FIG. 3 is advantageous when the device is used in applications wherein contaminants may reach chamber 14 via inlet 20. By connecting the Bourdon tube inlet with chamber 16, which is separated from the inlet 20 by diaphragm 18, the chance of contaminants reaching the Bourdon tube is substantially reduced.

Save for the different fluid flow path to tube 28 as described in the preceeding paragraphs, the operation of this second form of the invention is identical to that of the first embodiment. Accordingly, the operational details will not be repeated.

Having now described the invention in detail in accordance with the requirements of the patent statutes, those skilled in this art will have no difficulty in making changes and modifications in the individual parts or in their relative assembly in order to meet specific requirements or conditions. Such changes and modifications may be made without departing from the scope and spirit of the invention, as set forth in the following claims.

We claim:

1. A combination fluid pressure gage and pressure relief device for interconnection with a source of fluid under pressure, said device being adapted to measure fluid pressure within a predetermined range and being adapted to automatically vent to atmosphere upon over pressurization of the device beyond the predetermined pressure range, said device comprising:

(a) a housing having first and second chambers, said first chamber having a fluid inlet in communication with the source of fluid under pressure and said second chamber having first and second passageways adapted to communicate with atmosphere upon over pressurization of the device;

(b) a diaphragm carried by said housing normally separating said first and second chambers, said diaphragm being movable from a first position closing said first passageway of said second chamber to a second position opening said first passageway and being provided with a fluid passageway interconnecting said first and second chambers;

(c) valve means carried by said housing for normally closing said second passageway of said second chamber; and (d) fluid pressure measuring means carried by said housing for measuring the pressure exerted by fluid within said fluid inlet within a range of zero pressure to a predetermined maximum pressure, said means comprising:

(1) pressure sensing means for sensing fluid pressure within said first chamber; and (2) operating means operably associated with said pressure sensing means for operating said valve means to open said second passageway of said second chamber to atmosphere upon the fluid pressure within said inlet exceeding the predetermined maximum pressure.

2. A device as defined in claim 1 including biasing means for yieldably biasing said diaphragm toward said first position.

3. A device as defined in claim 1 in which said valve means comprises:

(a) a yieldably deformable body portion carried by said housing, said portion being movable by said operating means from a first position to a second position; and (b) a valve seat connected to said body portion and movable in response to movement thereof, said valve seat being adapted to close said second passageway when said body portion is in a first position and to open said second passageway upon movement of said body portion to said second position.

4. A device as defined in claim 3 in which said fluid pressure measuring means includes indicating means operably associated with said operating means and in which said operating means comprises a pivotally movable member interconnected with said pressure sensing means, said member being movable from a first zero pressure position to a second maximum pressure position wherein said member moves into pressural engagement with said yieldably deformable body portion of said valve means to move said body portion into said second position.

5. A device as defined in claim 4 in which said body portion is only manually resettable from said second position to said first position.

6. A device as defined in claim 4 in which said indicating means includes a movable pointer and a gage face displaying pressure indicating indicia, said pointer being operably associated with said pivotally movable member and movable relative to said gage face in response to pivotal movement of said pivotally movable member.

7. A safety pressure gage adapted to be interconnected with a source of fluid under pressure, comprising:

(a) a housing having first and second internal chambers, said first chamber having a fluid inlet in communication with the source of fluid under pressure and said second chamber having first and second passageways extending to the exterior of said housing;

(b) a diaphragm carried by said housing separating said first and second chambers, said diaphragm being movable from a first position closing said first passageway to a second position opening said first passageway upon overpressure of the gauge and being provided with a fluid passageway interconnecting said first and second chambers;

(c) valve means carried by said housing for closing said second passageway of said second chamber, said valve means comprising:

(1) a body portion carried by said housing and movable from a first position to a second position; and (2) a valve seat connected to said body portion and movable therewith from a first position wherein said valve seat closes and second passageway into a second position wherein said second passageway is opened to atmosphere; and (d) fluid pressure measuring means carried by said housing for measuring the pressure exerted by fluid within said fluid inlet within a range of zero pressure to a predetermined maximum pressure, said means comprising:

(1) pressure sensing means for sensing fluid pressure within said fluid inlet;

(2) operating means operably associated with said pressure sensing means for operating said valve means to move said valve seat into said second position; and (3) indicating means operable by said operating means for indicating pressure within said fluid inlet between zero pressure and a predetermined maximum pressure.

8. A safety pressure gage as defined in claim 7 in which said operating means is adapted to operate said valve means upon said indicating means indicating pressure in excess of said predetermined maximum pressure.

9. A safety pressure gage as defined in claim 7 in which said pressure sensing means comprises an elongated, yieldably deformable hollow tube affixed proximate one end to said housing and interconnected proximate its opposite end with said operating means, said interior of said tube being in communication with said fluid inlet.

10. A safety pressure gage as defined in claim 9 in which said operating means comprises a sector gear pivotally movable in response to movement of said opposite end of said tube and in which said indicating means comprises a rotatable shaft and a pointer connected thereto, said shaft being rotatable by pivotal movement of said sector gear.

11. A safety pressure gage as defined in claim 10 in which said body portion of said valve means comprises a toggle action leaf spring engageable by said sector gear upon said indicating means indicating pressure in excess of said predetermined maximum pressure said spring being movable by said sector gear from a first convex configuration to a second concave configuration.

12. A combination fluid pressure gage and pressure relief device for interconnection with a source of fluid under pressure, said device being adapted to measure fluid pressure within a predetermined range and being adapted to automatically vent to atmosphere upon over pressurization of the device beyond the predetermined pressure range, said device comprising:

(a) a housing having first and second chambers, said first chamber having a fluid inlet passageway in communication with the source of fluid under pressure, said fluid inlet passageway terminating in a relief valve seat and said second chamber having first and second passageways adapted to communicate with atmosphere upon over pressurization of the device;

(b) a diaphragm carried by said housing separating said first and second chambers, said diaphragm being movable from a first position in engagement with said relief valve seat to close off said first passageway to a second position spaced apart from said relief valve seat to open said first passageway upon overpressure of the gauge and being provided with a fluid passageway interconnecting said first and second chambers;

(c) biasing means carried by said housing for yieldably urging said diaphragm toward said first position;

(d) valve means carried by said housing for closing said second passageway of said second chamber, said valve means comprising:

(1) a yieldably deformable body portion carried by said housing and movable from a first convex position to a second concave position; and (2) a valve seat connected to said body portion and movable therewith from a first position wherein said valve seat closes said second passageway into a second position wherein said second passageway is opened to atmosphere; and (e) fluid pressure measuring means carried by said housing for measuring the pressure exerted by fluid within said fluid inlet within a range of zero pressure to a predetermined maximum pressure, said means comprising:

(1) pressure sensing means for sensing fluid pressure within said fluid inlet, said means comprising an elongated yieldably deformable hollow tube having first and second ends, said first end being affixed to said housing with the interior of said tube being in communication with said fluid inlet; and (2) operating means for operating said valve means comprising a pivotally movable sector gear, said gear being interconnected with said second end of said hollow tube and being pivotally movable in response to movement thereof from a zero pressure position to an overpressure position wherein said gear moves into pressural engagement with said yieldably deformable body portion of said valve means.

* * * * *